United States Patent
Cho et al.

(10) Patent No.: US 8,738,329 B2
(45) Date of Patent: May 27, 2014

(54) CALIBRATION METHOD/SYSTEM AND VERIFICATION METHOD FOR DIGITAL TORQUE TOOLS

(75) Inventors: Chih-Hua Cho, Nantou County (TW); Hsin-Chuan Su, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 581 days.

(21) Appl. No.: 13/039,538

(22) Filed: Mar. 3, 2011

(65) Prior Publication Data

US 2012/0143552 A1  Jun. 7, 2012

(30) Foreign Application Priority Data

Dec. 1, 2010 (TW) ................. 99141680 A

(51) Int. Cl.
*G06F 11/30* (2006.01)

(52) U.S. Cl.
USPC ........................................ 702/183

(58) Field of Classification Search
USPC ............ 702/85, 104, 108, 118, 122, 183, 188
See application file for complete search history.

(56) References Cited

U.S. PATENT DOCUMENTS

| | | | |
|---|---|---|---|
| 4,253,325 A | 3/1981 | Reed et al. | |
| 4,483,177 A | 11/1984 | McIntyre et al. | |
| 4,543,814 A | 10/1985 | Heilman | |
| 4,562,722 A | 1/1986 | Schuele et al. | |
| 4,761,989 A | 8/1988 | McDevitt | |
| 4,899,596 A | 2/1990 | Janik et al. | |
| 5,911,154 A | 6/1999 | Hsieh | |
| 6,012,323 A | 1/2000 | Soderholm et al. | |
| 6,269,702 B1 | 8/2001 | Lambson | |
| 6,450,045 B1 | 9/2002 | Crane et al. | |
| 6,566,840 B1 | 5/2003 | Wu et al. | |
| 6,865,958 B2 | 3/2005 | Herbold | |
| 7,222,544 B1 | 5/2007 | Jenkins | |
| 7,526,941 B2 | 5/2009 | Doe | |

(Continued)

FOREIGN PATENT DOCUMENTS

| | | |
|---|---|---|
| CN | 87208350 U | 1/1988 |
| CN | 101526413 A | 9/2009 |

(Continued)

OTHER PUBLICATIONS

Torgue Sensor Calibration Using Virtual Load for a Manipulator Sang-Huuk Lee et al. Proceediongs of the 3008 IEEE/RSJ International Conference on Intelligent Robots and Systems San Diego, A USA (Oct. 29, 2007).

(Continued)

*Primary Examiner* — Mohamed Charioui
(74) *Attorney, Agent, or Firm* — WPAT, PC; Justin King

(57) ABSTRACT

A calibration method/system and verification method for digital torque tools are disclosed, in which the calibration method comprises the steps of: transmitting a data containing usage records of a digital torque tool at a client end to a remote calibration platform; comparing the data of usage records with statistic data stored in the calibration platform so as to obtain a data relating to average degree of fatigue; performing a calculation based upon the data of usage record and the data of average degree of fatigue so as to obtain a calibration data; transmitting the calibration data to the client end while allowing the calibration data to overwrite the corresponding original torque data of the digital torque tool.

8 Claims, 5 Drawing Sheets

(56) References Cited

U.S. PATENT DOCUMENTS

| | | | |
|---|---|---|---|
| 7,647,808 B2 | 1/2010 | Junkers | |
| 2005/0066056 A1* | 3/2005 | Dominic | 709/245 |
| 2008/0114494 A1 | 5/2008 | Nixon | |
| 2010/0170370 A1* | 7/2010 | Yokoyama et al. | 81/479 |
| 2012/0095961 A1* | 4/2012 | Meyer et al. | 707/634 |

FOREIGN PATENT DOCUMENTS

| | | |
|---|---|---|
| CN | 101715383 A | 5/2010 |
| JP | 2006-90745 A | 4/2006 |
| TW | M272980 | 8/2005 |
| TW | 201022651 | 6/2010 |
| TW | M381484 | 6/2010 |
| TW | 1327507 | 7/2010 |

OTHER PUBLICATIONS

Dynamic Torque Measurement for Automotive Application Brusamarello,Valener et al. Instrumentation and Measurement Technology Conference(I2MTC),2010IEEE (May 3, 2010).

Instrumentation Technology Development Dro et al. Journal of Machinery Industry (Apr. 1, 2007).

Taiwan Patent Office, "Office Action", Oct. 14, 2013.

Chinese Patent Office, "Office Action", Dec. 26, 2013.

\* cited by examiner

CALIBRATION METHOD/SYSTEM AND VERIFICATION METHOD FOR DIGITAL TORQUE TOOLS

TECHNICAL FIELD

The present disclosure relates to a calibration method/system and verification method for digital torque tools, and more particularly, to a calibration method/system capable of obtaining a calibration data according to a statistic usage record relating to average degree of fatigue or a calculation of multiple-points operations while performing a remote precision calibration through a simple hardware platform for registering the calibration data into the memory of a digital torque tool that is to be calibrated.

TECHNICAL BACKGROUND

The availability of an effective, reliable and accurate means for calibrating digital torque tools is one of the key factors for insuring digital torque tools to be used in more and more popularized in the years to come. Taking a digital torque wrench for instance, its precision specification is usually defined as ±1~5%, but the reliably of such precision can varied or deteriorated during the extended usage of the digital torque wrench, so that it is required to be calibrated for insuring the same to function effectively and accurately within the range of its precision specification. It is noted that the difference between a digital torque wrench and a mechanical torque wrench is that: the digital torque wrench is equipped with an electronic means for accurately measuring and displaying the amount of torque applied thereby.

Conventionally, the devices for calibrating digital torque wrenches can be divided into two types, which are the automatic torque testers and the torque balance testers. Operationally, the automatic torque tester will use a driving motor to exert a varying force upon a digital torque wrench that is to be calibrated, causing the torque meter of the test and the sensor of the digital torque wrench to issue signals in response to the varying force to a processing unit of the tester, in which the characteristic curve corresponding to the signals from the sensor of the digital torque wrench is compared with a standard stain curve of the torque meter that is registered in the processing unit for allowing the standard stain curve to overwrite the characteristic curve corresponding to the signals and thus to be registered into the memory of the digital torque wrench, and thereby, calibrating the characteristic curve of the digital torque wrench to match exactly with the standard stain curve of the torque meter. On the other hand, the torque balance tester will compare the torque value displayed on a digital torque wrench that is to be calibrated with a standard torque value obtained from the torque balance tester so as to obtain an error value for the digital torque wrench, but without calibrating data registered in the memory of the digital torque wrench according to the error value. However, no matter the calibration is performed by the automatic torque testers or by the torque balance testers, the procedure for calibrating a digital torque wrench typically requires that the tool be sent to a facility that specializes in digital torque wrench calibration. The time that is required to calibrate the digital torque wrench can significantly vary, which can take two to four weeks depending on the size and capabilities of the calibration facility, and the owner of the digital torque wrench is usually required to pay for the shipping of the tool or tools both ways as well as the calibration fee.

There are already many studies for improving the aforesaid disadvantages regarding to the calibrating of digital torque tools. One of which is a torque wrench with wireless communication ability, disclosed in TW Pat. No. M381484, in which the two-way wireless communication between the torque processing circuit of at least one torque wrench and a controller is enabled for allowing the controller to receive remotely and simultaneously the information relating to the torque value of the at least one torque wrench that is issued from the corresponding torque processing circuit. Thereby, since the controller is further being connected to an electronic calculation device, such as a personal computer (PC), a personal digital assistant (PDA), or a notebook computer, in a wireless or wired manner, the torque output of the at least one torque wrench can be processed and managed by the electronic calculation device, i.e. the operation of the at least one torque wrench can be controlled by the electronic calculation device. However, although the operation of each torque wrench is controlled and managed by the electronic calculation device in a wireless manner, there is no embodiment in the aforesaid disclosure describing how to calibrate the torque wrenches that are wirelessly connected to the electronic calculation device.

Another such study is an intelligent control system for torque tester and the torque testing method used thereby, disclosed in TW Pat. No. 201022651, in which the intelligent control system is adapted specially for controlling a torque tester and provides a human interface that is designed aiming for minimizing the repetition of parameter input and thus reducing the happening of human error so as to speed up the operation of the torque tester. Operationally, the intelligent control system, that is operated by a user, is enabled to connected remotely through Internet with a diagnosis module located in the facility specializing in digital torque tool calibration, and thus either the user is able to select options of diagnosis displayed on the human interface that are transmitted remotely from the diagnosis module for calibrating the torque tester, or an operator of the diagnosis module is able to calibrate the torque tester remotely through the connection between the diagnosis module and the human interface of the intelligent control system. However, the aforesaid remote communication is used for calibrating torque testers, but not designed for calibrating torque tools, not to mention that there is no method and procedure being embodied in the aforesaid disclosure describing how to calibrate torque tools.

Further another such study is an electronic torque-tool tester disclosed in U.S. Pat. No. 7,222,544, in which the electronic torque-tool tester is characterized in that: it is configured with a digital display unit to be used for displaying a torque applied by a torque tool in a real time manner as the detection of the torque is digitized by a microprocessor. However, there is no method and procedure being embodied in the aforesaid disclosure describing how to calibrate torque tools.

TECHNICAL SUMMARY

The present disclosure provides a calibration method/system capable of obtaining a calibration data according to a statistic usage record relating to average degree of fatigue or a calculation of multiple-points operations while performing a remote precision calibration through a simple hardware platform for registering the calibration data into the memory of a digital torque tool that is to be calibrated.

Furthermore, the present disclosure provides a calibration method for digital torque tools, comprising the steps of: (a) transmitting a data containing usage records of a digital torque tool at a client end to a remote calibration platform; (b) comparing the data of usage records with statistic data stored in the calibration platform so as to obtain a data relating to average degree of fatigue; (c) performing a decrement calculation based upon the data of usage record and the data of average degree of fatigue so as to obtain a calibration data; and (d) transmitting the calibration data to the client end while allowing the calibration data to overwrite the corresponding original torque data of the digital torque tool.

Furthermore, the present disclosure provides a verification method for digital torque tools, comprising the steps of: (a) arranging a standard torque meter at a client end; (b) mounting a digital torque tool to be tested on the standard torque meter for allowing a plurality of torque values of the standard torque meter as well as a plurality of tested torque values of the tested torque tool, that are corresponded to the plural torque values of the standard torque meter in respective, to be measured and obtained; (c) transmitting the plural torque values and the plural corresponding tested torque values to a calibration platform so as to be analyzed for obtaining a data of verification characteristics; and (d) transmitting the data of verification characteristics to the client end so as to register the data of verification characteristics into a torque data stored in a memory of the digital torque tool.

In addition, the present disclosure provides a calibration system for digital torque tools, comprising: a calibration platform, configured with a server and a database having static data relating to the digital torque tool stored therein; a computing unit, electrically connected to the calibration platform through a network while electrically connecting to a digital torque tool for enabling a data containing usage records of the digital torque tool to be transmitted to the calibration platform through the computing unit, and thus enabling the calibration platform to perform an analysis according to a comparison between the data of usage records and the statistic data stored in the calibration platform.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DESCRIPTION OF THE EXEMPLARY EMBODIMENTS

For your esteemed members of reviewing committee to further understand and recognize the fulfilled functions and structural characteristics of the disclosure, several exemplary embodiments cooperating with detailed description are presented as the follows.

Figure 1:
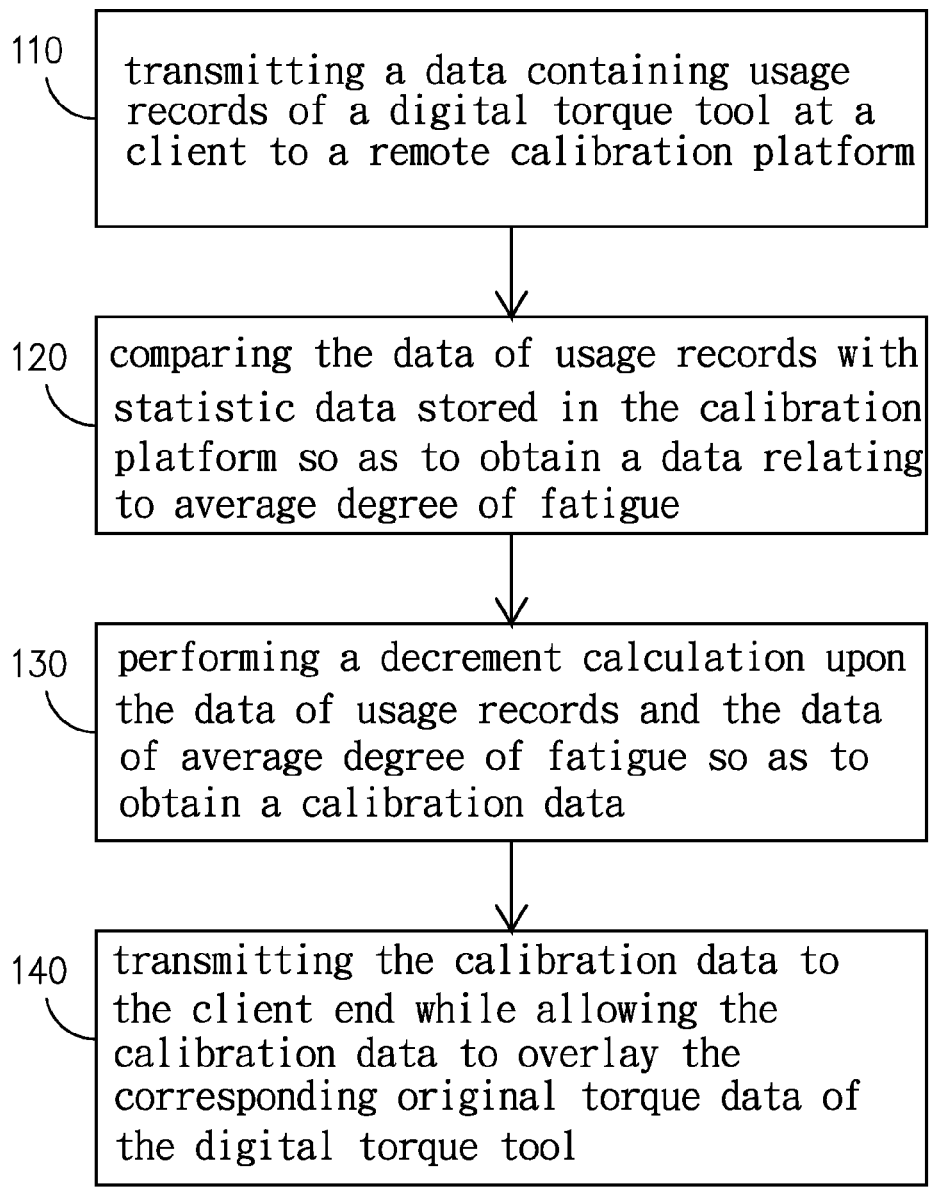
FIG. 1 is a flow chart showing the steps of a calibration method for digital torque tools according to an embodiment of the present disclosure.

Please refer to FIG. 1, which is a flow chart showing the steps of a calibration method for digital torque tools according to an embodiment of the present disclosure. As shown in FIG. 1, the calibration method comprises the following steps:

Step 110: transmitting a data containing usage records of a digital torque tool at a client end to a remote calibration platform;

Step 120: comparing the data of usage records with statistic data stored in the calibration platform so as to obtain a data relating to average degree of fatigue;

Step 130: performing a decrement calculation based upon the data of usage record and the data of average degree of fatigue so as to obtain a calibration data; and Step 140: transmitting the calibration data to the client end while allowing the calibration data to overwrite the corresponding original torque data of the digital torque tool.

Figure 2:
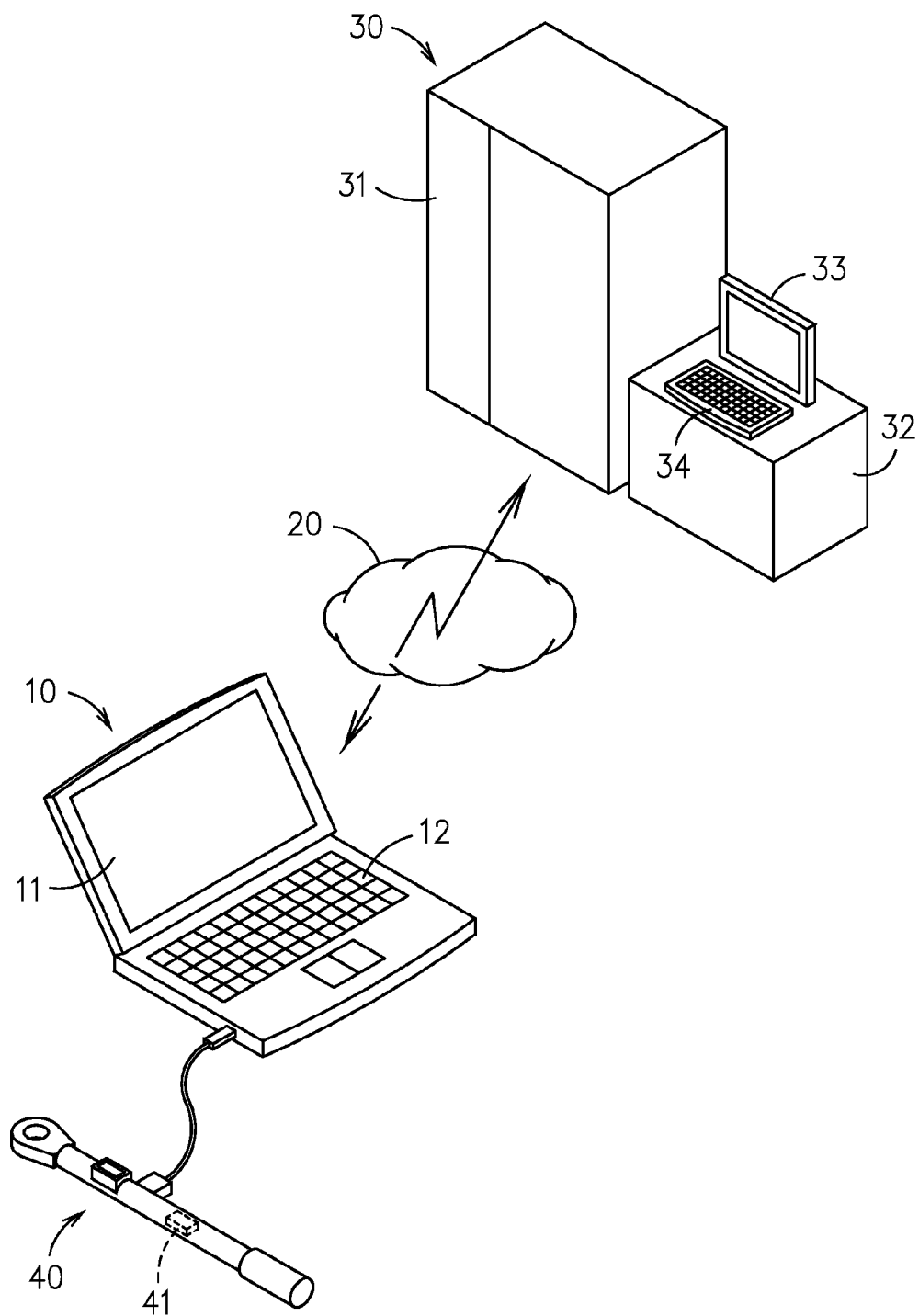
FIG. 2 is a schematic diagram showing a calibration system for digital torque tools according to an embodiment of the present disclosure.

Please refer to FIG. 2, which is a schematic diagram showing a calibration system for digital torque tools according to an embodiment of the present disclosure. As shown in FIG. 2, during the performing of the step 110, the computing unit 10 is disposed at the client end in a manner that it is electrically connected to the remote calibration platform 30 through a network 20 while being electrically connected to the digital torque tool 40, so that the digital torque tool 40 is connected electrically with the remote calibration platform 40 through the computing unit 10 and the network 20. In this embodiment, the computing unit 10, being configured with a display 11 and a keyboard 12, can be a device selected from the group consisting of: a desktop computer, a personal digital assistant, a notebook computer, and the like. Moreover, the digital torque tool 40 has a memory 41 embedded therein to be used for storing the data containing usage records as well as the original torque data of the digital torque tool 40, in that the original torque data can be data relating to the relationship between torque and stain in the digital torque tool 40 for instance, and the data containing usage records of the digital torque tool 40 can include: the model number of the digital torque tool 40, serial number of the digital torque tool 40, the maximum permissible torque of the digital torque tool 40, the maximum working torque of the digital torque tool 40, the designated working torque ranges of the digital torque tool 40, and the actual times of usage corresponding to each designated working torque range of the digital torque tool 40. In an embodiment, the maximum permissible torque of the digital torque tool 40 can be defined as 130 percents of the specified torque value of the digital torque tool 40, the maximum working torque of the digital torque tool 40 is the largest torque being exerted on the digital torque tool 40 by a user, and the designated working torque ranges of the digital torque tool 40 can include: a range between 50~75 Nm, a range between 75~100 Nm, a range between 100~130 Nm, or can include: a range between 75%~100% of the specified torque value, and a range between 100%~130% of the specified torque value. In addition, the calibration platform 30 is comprised of: a server 31, a database 32, a display device 33 and a keyboard 34, in which the server 31 is used for data processing and calculation; the database 32 is used for storing static data relating to the digital torque tool 40, whereas the static data can include: the model number and the serial number of the digital torque tool 40, the designated working torque ranges (e.g. a range between 50~75 Nm, a range between 75~100 Nm, a range between 100~130 Nm, or can include: a range between 75%~100% of the specified torque value, and a range between 100%~130% of the specified torque value), and the actual times of usage as well as the degree of fatigue that are corresponding to each designated working torque range of the digital torque tool 40. In materials science, fatigue is the progressive and localized structural damage that occurs when a material is subjected to cyclic loading, usually being represented as the abrupt variations in a stress-stain curve.

Before the step 120 is performed, a confirmation procedure is being executed for determining whether the electrical connection between the digital torque tool 40 and the remote calibration platform 30 is achieved validly through signals displayed on the display 11 at the client end for ensuring the data containing usage records of the digital torque tool 40 to be validly received by the calibration platform 30, and then if the validity of data receiving is confirmed, then determining whether the maximum working torque in the usage record data exceeds the maximum permissible torque of the digital torque tool 40. In an embodiment of the present disclosure, the maximum permissible torque is defined to be 125 percents of the specified torque value of the digital torque tool 40 according to the overloading test of ISO6789, or considering the accuracy error of a common digital torque tool is about 5%, the maximum permissible torque is defined to be 130 percents of the specified torque value of the digital torque tool 40, but it is not limited thereby and thus can be defined to be any percentage at will. Moreover, if both the following description is true, i.e. the data containing usage records of the digital torque tool 40 is being validly received by the calibration platform 30, and the maximum working torque in the usage record data is not exceed the maximum permissible torque of the digital torque tool 40, then the step 120. However, if any of the following description is true, i.e. the data containing usage records of the digital torque tool 40 is not being validly received by the calibration platform 30, or the maximum working torque in the usage record data exceeds the maximum permissible torque of the digital torque tool 40, then the flow of the calibration method is enabled to proceed back to the step 110 while enabling the display 11 at the client end to display a error signal.

The step 120 is performed in the condition that both the following description is true, i.e. the data containing usage records of the digital torque tool 40 is being validly received by the calibration platform 30, and the maximum working torque in the usage record data is not exceed the maximum permissible torque of the digital torque tool 40. In the step 120, the calibration platform 30 compares the received data of usage records with statistic data that is stored in the database 32 of the calibration platform 30 so as to obtain a data relating to average degree of fatigue. The can be various ways for calculating the average degree of fatigue. For instance, the data relating to average degree of fatigue in the step 120 is obtained using the following equation:

$$D=(n1/N1 \times D1 + \ldots + nX/NX \times DX);$$

nX is the actual times of usage corresponding to the $X_{th}$ designated working torque range of the digital torque tool, X=1 . . . X, representing the number of designated working torque ranges;

NX is the times of test being executed within the $X_{th}$ designated working torque range of the digital torque tool, X=1 . . . X; and DX is the degree of fatigue resulting from the performing of the NX times of test within the $X_{th}$ designated working torque range of the digital torque tool, X=1 . . . X.

Figure 3:
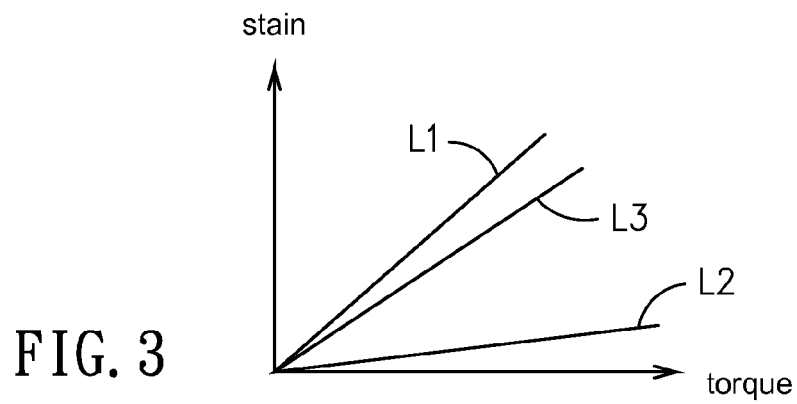
FIG. 3 is a schematic diagram showing how a calibration data can be obtained from the data of usage record and the data of average degree of fatigue in the present disclosure.

After the step 120 is complete, the flow proceeds to step 130. At step 130, a calculation is performed based upon the data of usage record and the data of average degree of fatigue so as to obtain a calibration data. Please refer to FIG. 3, which is a schematic diagram showing how a calibration data can be obtained from the data of usage record and the data of average degree of fatigue in the present disclosure. In FIG. 3, the line L1 represents the torque data of the digital torque tool 40 before being calibrated and the line L2 represents the data of average degree of fatigue (D) obtained from the step 120, and the line L3 represents the calibrated data obtained from the performing of a decrement calculation based on the line L1 and the line L2.

Figure 4:
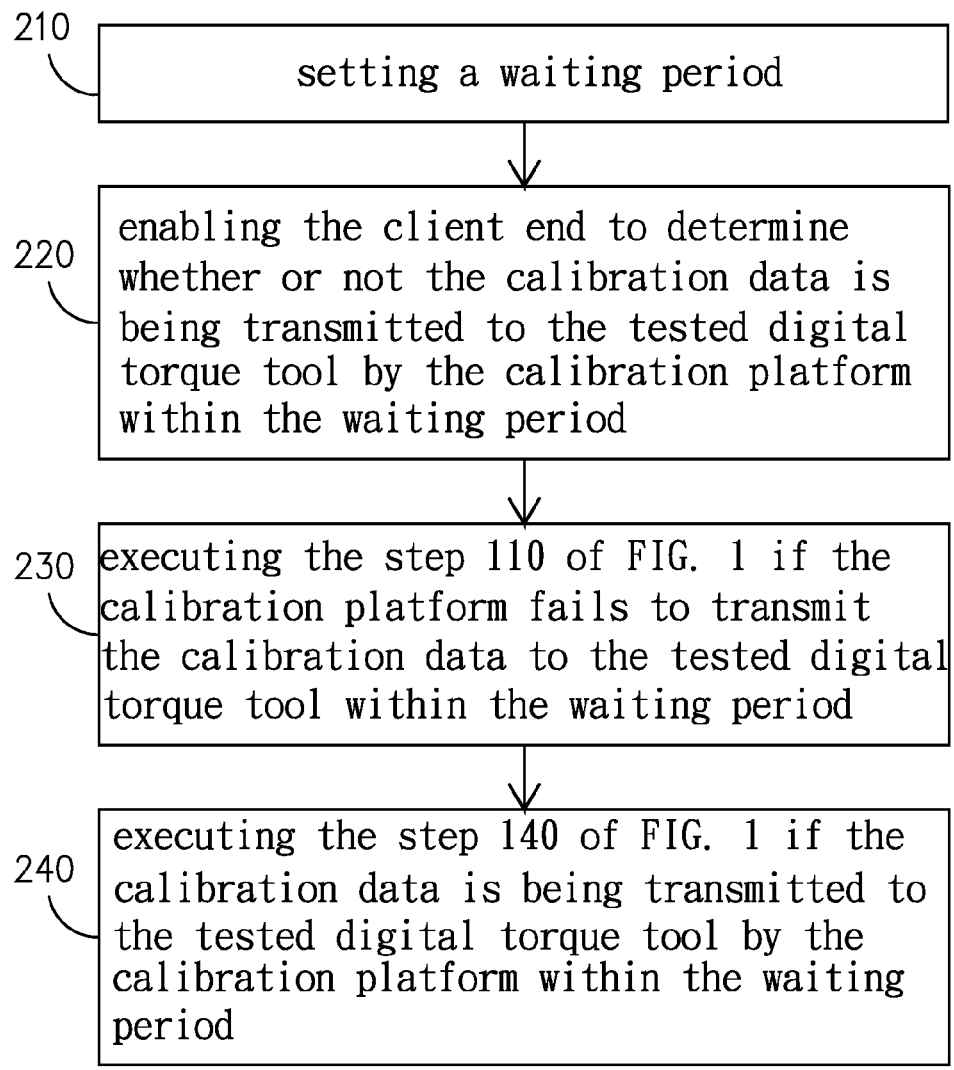
FIG. 4 is a flow chart showing the steps of a waiting procedure performed in the calibration method of the present disclosure.

After the step 130 is complete, the flow proceeds to step 140. At step 140, the calibration data is transmitted to the client end through the network 20 and then is being send to the digital torque tool 40 through the computing unit 10 for allowing the calibration data to overwrite the corresponding torque data of the digital torque tool 40 that is originally registered in the memory 40 of the digital torque tool 40 before being calibrated, and thus the calibration of the digital torque tool 40 is completed. However, in order to prevent the calibration data that is obtained from the step 130 from being damaged or lost during the transmission, the calibration method is designed to execute a waiting procedure before the step 140. As shown in FIG. 4, the waiting procedure further comprises the steps of:

Step 210: setting a waiting period, which can be determined at the client end as required, and in an embodiment, the waiting period can be set to be one minute;

Step 220: enabling the client end to determine whether or not the calibration data is being transmitted to the tested digital torque tool 40 by the calibration platform 30 within the waiting period;

Step 230: executing the step 110 of FIG. 1 if the calibration platform 30 fails to transmit the calibration data to the tested digital torque tool 40 within the waiting period; and Step 240: executing the step 140 of FIG. 1 if the calibration data is being transmitted to the tested digital torque tool 40 by the calibration platform 30 within the waiting period.

Thereby, the digital torque tool 40 can be ensured to receive a calibration data that is correct and valid.

Figure 5:
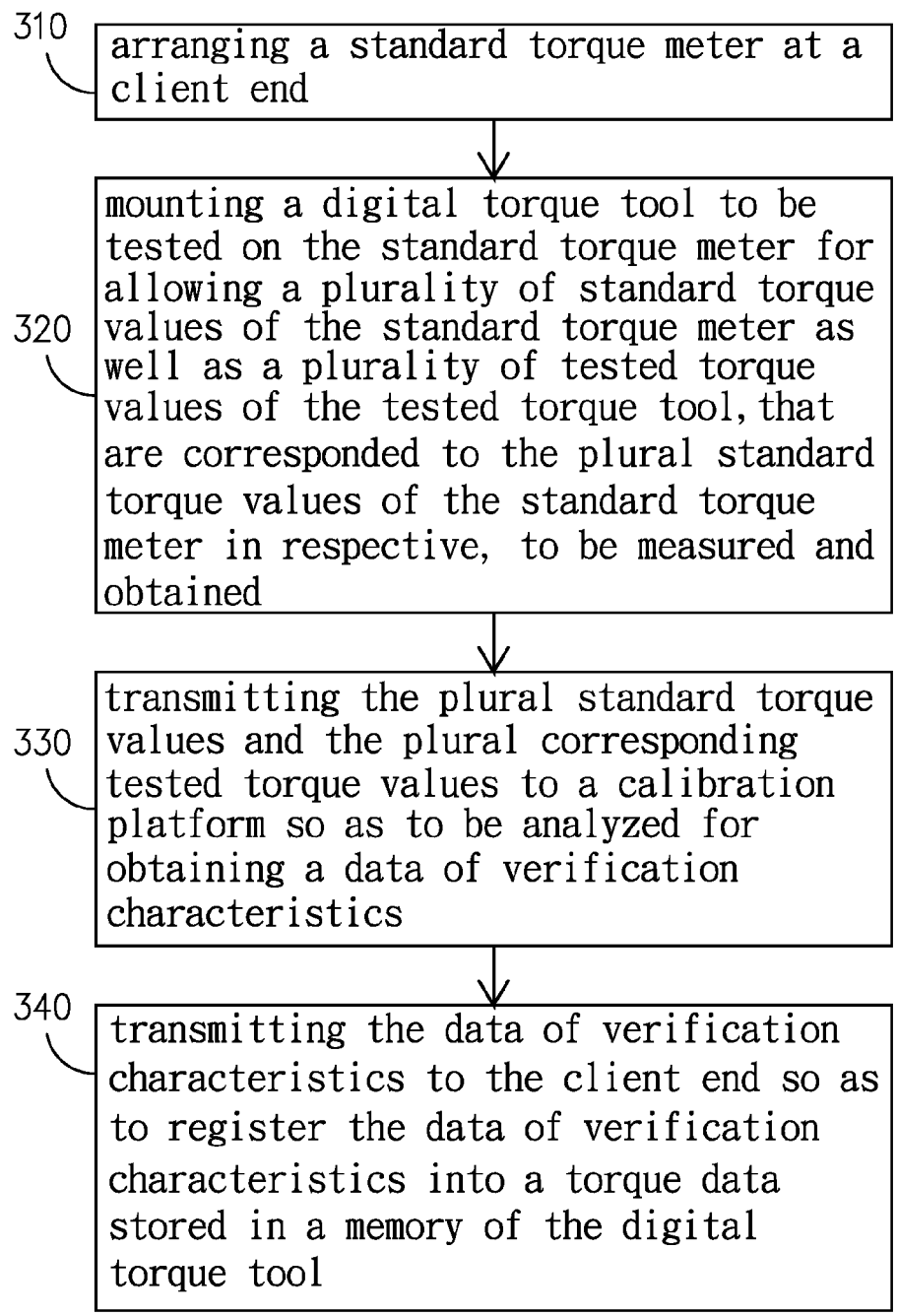
FIG. 5 is a flow chart showing the steps of a verification method for digital torque tools according to an embodiment of the present disclosure.

Moreover, as shown in FIG. 2, it is common that there can many statistic data corresponding to a variety of digital torque tool of different model numbers being stored in the database 32 of the server 31 in the calibration platform 30, so that one calibration platform 30 is equipped with the ability for calibrating those various digital torque tool of different model numbers. Thus, when a digital torque tool 40 at the client end is electrically connected to the computing unit 10 and transmitting the usage record data of the digital torque tool 40 to the calibration platform 30 through the network 20, the calibration platform 30 will have to first recognize the model number of the digital torque tool 40 from the usage record data so as to be able to retrieve the static data conforming to the recognized model number for preparing the same to execute the step 120 of FIG. 1. However, it is possible that there is no such statistic data conforming to the recognized model number of the digital torque tool 40 that is being registered in the calibration platform 30, or the data containing usage records of the digital torque tool 40 contains zero entries due to the fact that if the test digital torque tool 40 is a new model or the data is damaged. Consequently, the calibration platform 30 is incapable of calibrating such digital torque tool 40. Accordingly, the calibration method is designed to execute a checking procedure before the step 120, which is performed for determining whether the data containing usage records of the digital torque tool 40 contains zero entries, or whether there is a statistic data corresponding to the model number of the digital torque tool in the data containing usage records that is stored in the database 32 of the calibration platform 30; if any one of the following description is true, i.e. there is at least one entries contained in the data containing usage records of the digital torque tool 40, or there is a statistic data corresponding to the model number of the digital torque tool 40 in the data containing usage records that is stored in the database 32 of the calibration platform 30, then the step 120 and its posterior steps are proceeded; otherwise, a verification procedure is executed. As shown in FIG. 2 and FIG. 5, the verification procedure further comprises the steps of:

Step 310: arranging a standard torque meter at a client end, whereas the standard torque meter that is not shown in the figures can be in any shape and type whichever is capable of measuring the torque of the digital torque tool 40;

Step 320: mounting the digital torque tool 40 to be tested on the standard torque meter for allowing a plurality of standard torque values of the standard torque meter as well as a plurality of tested torque values of the tested torque tool, that are corresponded to the plural standard torque values of the standard torque meter in respective, to be measured and obtained;

Step 330: transmitting the plural standard torque values and the plural corresponding tested torque values to a calibration platform 30 so as to be analyzed for obtaining a data of verification characteristics; and Step 340: transmitting the data of verification characteristics to the client end so as to register the data of verification characteristics into the torque data stored in a memory 41 of the digital torque tool 40.

Figure 6:
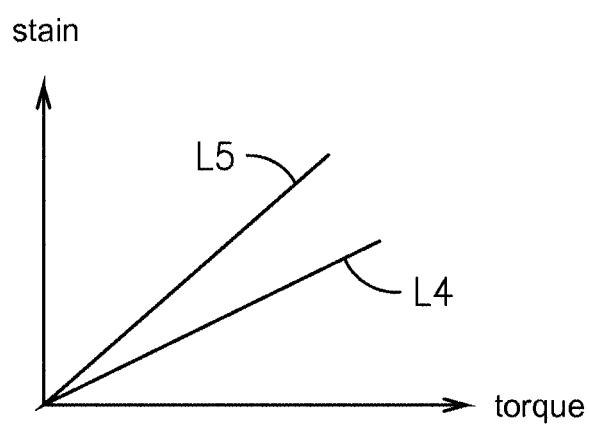
FIG. 6 is a graph showing the relationship between the standard torque values of a torque meter and the tested torque values of a digital torque tool to be tested in the present disclosure.

After the registering of the verification characteristics, the calibration method proceeds back to the step 110 of FIG. 1 for restarting the calibration of the digital torque tool 40. Moreover, it is noted that there can be a variety ways for obtaining the data of verification characteristics. Please refer to FIG. 6, which is a graph showing the relationship between the standard torque values of a torque meter and the tested torque values of a digital torque tool to be tested in the present disclosure. As shown in FIG. 6, the line L4 is drawn using the plural tested torque values of the tested torque tool 40, which represents the torque characteristic of the digital torque tool 40 before being calibrated. In an embodiment, a proportionality coefficient can be obtained based upon the plural standard torque values and the plural corresponding tested torque values, that are obtained in the step 320, whereas the proportionality coefficient can be obtained in a manner that: first, performing linear regression calculations respectively upon the plural standard torque values and the plural corresponding tested torque values for obtained two values, and then dividing one of the two value with another value and thus obtaining the proportionality coefficient. Accordingly, the data of verification characteristics, being represented by the line L5, can be obtained by multiplying the plural tested torque values, represented by the line L4, by the proportionality coefficient.

To sum up, the present disclosure provides a calibration method/system and verification method for digital torque tools, in which the calibration system comprises: a digital torque tool, having a rewritable memory embedded therein; a computing unit that is electrically connected to the digital tool; a calibration platform, being connected to a network and configured with a server with computation ability and a database. Operationally, the computing unit is enabled to transmit data of usage records corresponding to the digital torque tool to the remote calibration platform through the network, and then the server in the calibration platform is enabled to compare the received data of usage records of the digital torque tool with a static data stored in the database of the calibration platform so as to obtain a data relating to average degree of fatigue in a predefined manner as the one described hereinbefore, and thereafter, the server is enabled to perform a calculation based upon the data of usage record and the data of average degree of fatigue so as to obtain a calibration data. Thereafter, the calibration platform is enabled to transmitted the calibration data back to the digital torque tool through the computing unit for overwriting the corresponding original torque data of the digital torque tool that is originally registered in the memory of the digital torque tool before being calibrated. Thus, a precision calibration of the digital torque tool can be accomplished remotely using simple hardware that not only the time, but also the cost required to calibrate the digital torque tool can be reduced significantly.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A calibration method for a digital toque tools torque tool, comprising the steps of:
(a) transmitting a data containing usage records of said digital torque tool stored in a memory of said digital torque tool at a client end to a remote calibration platform, wherein the data containing usage records of the digital torque tool includes: the model number of the digital torque tool, serial number of the digital torque tool, the maximum permissible torque of the digital torque tool, the maximum working torque of the digital torque tool, the designated working torque ranges of the torque tool, and the actual times of usage corresponding to each designated working torque range of the digital torque tool;
(a1) determining by a computer unit whether the data containing usage records of the digital torque tool contains zero entries, or whether there is a statistic data corresponding to the model number of the torque tool in the data containing usage records that is stored in the calibration platform, if there is at least one entries contained in the data containing usage records of the digital torque tool, or if there is a statistic data corresponding to the model number of the digital torque tool in the data containing usage records that is stored in the calibration platform, then proceed with step (b), otherwise, executing a verification procedure, wherein the verification procedure comprises the steps of:
mounting the digital torque tool on a standard torque meter disposed at the client end for allowing a plurality of standard torque values of the standard torque meter as well as a plurality of tested torque values of the tested torque tool, that are corresponded to the plural torque values of the standard torque meter in respective, to be measured and obtained;

transmitting the plural standard torque values and the plural corresponding tested torque values to the calibration platform so as to be analyzed for obtaining a data of verification characteristics; and registering the data of verification characteristics into the digital torque tool and then enabling the calibration method to proceed back to the step (a);

(b) comparing the data of usage records with statistic data stored in the calibration platform so as to obtain a data relating to average degree of fatigue;

(c) performing a calculation based upon the data of usage record and the data of average degree of fatigue so as to obtain a calibration data; and (d) transmitting the calibration data to the client end while allowing the calibration data to overwrite the corresponding original torque data of the digital torque tool.

2. The calibration method of claim 1, wherein the calibration platform is enabled to obtain a proportionality coefficient based upon the plural standard torque values and the plural corresponding tested torque values, so as to calculate and thus obtain the data of verification characteristics by multiplying the plural tested torque values by the proportionality coefficient.

3. The calibration method of claim 1, wherein before the step (d) is performed, a waiting procedure is being executed, and the waiting procedure further comprises the steps of:

setting a waiting period;

enabling the client end to determine whether or not the calibration data is being transmitted to the tested digital torque tool by the calibration platform within the waiting period;

executing the step (a) if the calibration platform fails to transmit the calibration data to the tested digital torque tool within the waiting period; and executing the step (d) if the calibration data is being transmitted to the tested digital torque tool by the calibration platform within the waiting period.

4. The calibration method of claim 1, wherein the digital torque tool is configured with a memory, provided for storing the data of usage records, and the calibration platform has a server which is configured with a database, provided for storing the statistic data.

5. The calibration method of claim 1, wherein there is a computing unit disposed at the client end in a manner that the computing unit is electrically connected to the remote calibration platform through a network while being electrically connected to the digital torque tool, so that the digital torque tool is connected electrically with the remote calibration platform through the computing unit.

6. The calibration method of claim 1, wherein in the step (c), the calibration data is obtained by performing a decrement calculation upon the data of usage records and the data of average degree of fatigue.

7. A calibration method for a digital torque tool, comprising the steps of:

(a) transmitting a data containing usage records of said digital torque tool stored in a memory of said digital torque tool at a client end to a remote calibration platform, wherein the data containing usage records of the digital torque tool includes: the model number of the digital torque tool, serial number of the digital torque tool, the maximum permissible torque of the digital torque tool, the maximum working; torque of the digital torque tool, the designated working torque ranges of the digital torque tool, and the actual times of usage corresponding to each designated working torque range of the digital torque tool;

(b) determining by a computer unit whether the data containing usage records of the digital torque tool is being validly received by the calibration platform, and then determining whether the maximum working torque in the usage record data exceeds the maximum permissible torque of the digital torque tool, and if the data containing usage records of the digital torque tool is being validly received by the calibration platform, and if the maximum working torque in the usage record data is not exceed the maximum permissible torque of the digital torque tool, then proceed with step (c), otherwise, if the data containing usage records of the digital torque tool is not being validly received by the calibration platform, or if the maximum working torque in the usage record data exceeds the maximum permissible torque of the digital torque tool, then proceed back to the step (a);

(c) comparing the data of usage records with statistic data stored in the calibration platform so as to obtain a data relating to average degree of fatigue;

(d) performing a calculation based upon the data of usage record and the data of average degree of fatigue so as to obtain a calibration data; and (e) transmitting the calibration data to the client end while allowing the calibration data to overwrite the corresponding original torque data of the digital torque tool.

8. A calibration method for a digital torque tool, comprising the steps of:

(a) transmitting a data containing usage records of said digital torque tool stored in a memory of said digital torque tool at a client end to a remote calibration platform;

(b) comparing the data of usage records with statistic data stored in the calibration platform so as to obtain a data relating to average degree of fatigue, wherein the data relating to average degree of fatigue is obtained using the following equation:

$$D=(n1/N1 \times D1+ \ldots +nX/NX \times DX);$$

nX is the actual times of usage corresponding to the $X_{th}$ designated working torque range of the digital torque tool, X=1 ... X;

NX is the times of test being executed within the $X_{th}$ designated working torque range of the digital torque tool, X=1 ... X; and DX is the degree of fatigue resulting from the performing of the NX times of test within the $X_{th}$ designated working torque range of the digital torque tool, X=1 ... X;

(c) performing a calculation based upon the data of usage record and the data of average degree of fatigue so as to obtain a calibration data; and (d) transmitting the calibration data to the client end while allowing the calibration data to overwrite the corresponding original torque data of the digital torque tool.

* * * * *